Feb. 17, 1970  O. MUELLER  3,495,477
TRANSFER CASE ASSEMBLY
Filed Oct. 30, 1967  6 Sheets-Sheet 1

INVENTOR
OTTO MUELLER
BY Olsen and Stephenson
ATTORNEYS

Feb. 17, 1970   O. MUELLER   3,495,477
TRANSFER CASE ASSEMBLY
Filed Oct. 30, 1967   6 Sheets-Sheet 4

INVENTOR
OTTO MUELLER
BY
Olsen and Stephenson
ATTORNEYS

INVENTOR
OTTO MUELLER

INVENTOR
OTTO MUELLER
BY
Olsen and Stephenson
ATTORNEYS

United States Patent Office 3,495,477
Patented Feb. 17, 1970

3,495,477
TRANSFER CASE ASSEMBLY
Otto Mueller, 13 Byfield Lane,
Dearborn, Mich. 48120
Filed Oct. 30, 1967, Ser. No. 678,990
Int. Cl. F16h 35/04, 37/08
U.S. Cl. 74—650                                              12 Claims

ABSTRACT OF THE DISCLOSURE

Apparatus for a six wheel drive motor vehicle which includes a differential transfer case assembly connected by drive shafts to a front axle and to tandem rear axles by means of differential transmissions having hydraulic mechanisms for controlling the differential action of the wheels on each axle. The differential transfer case assembly has similar hydraulic mechanisms associated with each drive shaft for positively driving each such drive shaft at all times that driving torque is being transmitted to the transfer case assembly, but allowing limited differential action between the drive shafts under certain specific conditions so as to prevent undesirable wind-up of one drive shaft relative to either of the other drive shafts.

Cross references to related applications

The present invention is related to differential transmissions of the type shown in pending application Ser. No. 568,549, filed July 28, 1966, now Patent No. 3,393,582 and pending application Ser. No. 615,484, filed Feb. 13, 1967, now Patent No. 3,393,583.

Background of the invention

The present invention pertains to a differential transfer case assembly adapted primarily for use with four and six wheel drive vehicles to provide an effective inter-axle differential arrangement.

It is known to provide motor vehicles with differential transmissions having hydraulic mechanisms for controlling the relative turning between the axle shafts of the vehicle to overcome problems that arise when one of the drive wheels loses traction. When so providing four or six wheel drive vehicles, a suitable locking type of differential transmission is required for each axle shaft in order to assure that torque is transmitted to all drive wheels that have traction. Suitable transmissions of this general character are disclosed in Mueller Patent No. 3,198,035, granted Aug. 3, 1965 and Mueller Patent No. 3,230,795, granted Jan. 25, 1966, as well as in the above-identified pending applications.

One of the problems that is inherent in four or six wheel drive vehicles is the tendency of the drive shafts from the engine to the axles to wind-up because the axle shaft cannot be turned continuously at identically the same rate of rotation. If this occurs, for example, as the result of the tires on one axle being slightly larger in circumference than the tires on another axle, the associated drive shaft to one of the axles will wind-up until it is under sufficient stress so that the damage may occur to the drive shaft, or on the first occasion when the wheels associated with the wound-up drive shaft can slip relative to the driving shaft, such shaft will release with a snap. This is very undesirable, both from the safety standpoint, as well as from the standpoint of damage to the vehicle.

Summary of the invention

The present invention is directed particularly toward providing an improved differential transfer case assembly which will provide a substantially positive drive from the engine to each of a plurality of axle shafts and which is adapted to accommodate any winding-up that may occur in any of the drive shafts.

In a preferred form of the present invention, a differential transfer case assembly is provided which comprises a rotatable casing for transmitting an input torque from the engine to the plurality of axle shafts. A plurality of drive shaft members extend into the casing, each being connected to a different one of the axle shafts. Torque transmitting mechanisms are operatively coupled between the casing and each of the drive shaft members for transmitting all of the input torque in substantially equal portions from the casing to the drive shafts for turning such shafts constantly at substantially equal rates of revolutions. The torque transmitting mechanisms are operatively coupled together to permit relative rotation of the drive shafts relative to one another an amount to equalize irregularities in rates of revolution occurring between such shaft members so as to eliminate undesirable winding-up of one of such drive shafts relative to the others. In a preferred form of the invention, each of the torque transmitting mechanisms include hydraulic means for retaining the asociated shaft member and the casing together for co-rotation. In this form of the invention the torque transmitting mechanisms are coupled together by hydraulic circuits in communication with one another, each of said hydraulic means being responsive to the attempts of its associated drive shaft to turn relative to the casing, thereby to increase the pressure of the hydraulic fluid in its circuit so as to oppose such relative turning, and pressure regulating means are provided between the circuits, which means are responsive to pressure differentials between said circuits to release pressure in the circuit of higher pressures so that incremental turning of the associated shaft members relative to the casing can occur until a state of equilibrium between the pressures in the hydraulic circuits is reached. Thus, the differential case assembly will allow a limited turning of one drive shaft relative to the other drive shafts to overcome undesirable winding that may have occurred between such drive shafts.

It is an object of the present invention to provide an improved differential transfer case assembly which is constructed and arranged to provide a positive drive to a plurality of drive shafts and which is responsive to variations in the reaction forces from the plurality of drive shafts to equalize such reaction forces so as to prevent winding of one shaft relative to another shaft of the drive system.

Other objects of this invention will appear in the following description and appended claims, reference being had to the accompanying drawings forming a part of this specification wherein like reference characters designate corresponding parts in the several views.

Description of the preferred embodiment

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
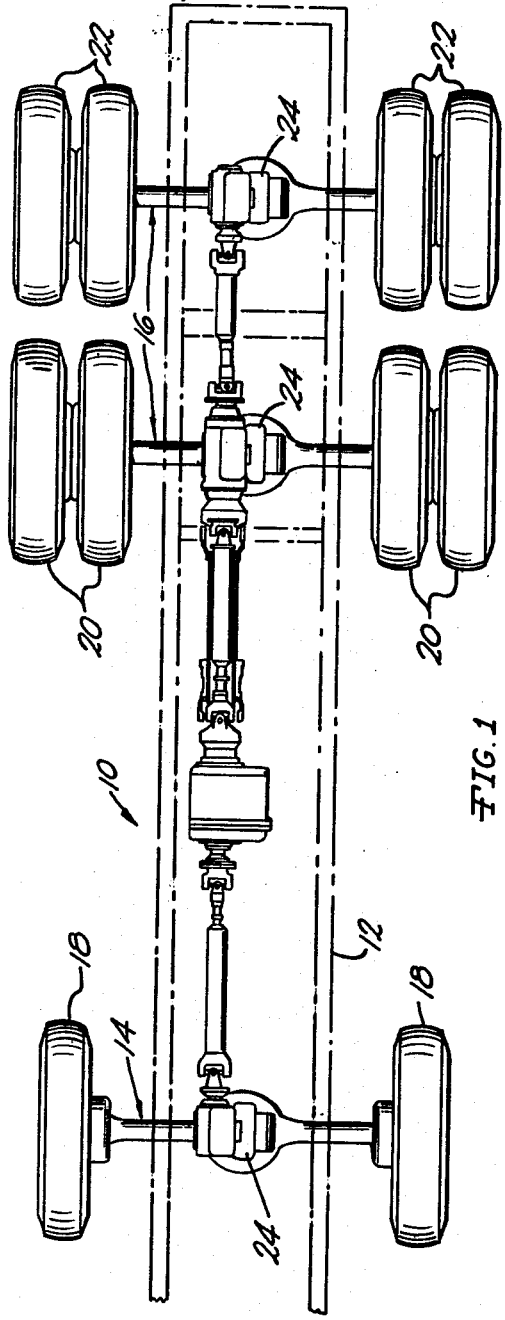
FIGURE 1 is a fragmentary schematic top plan view showing the drive assembly of a six wheel drive vehicle.
Figure 2:
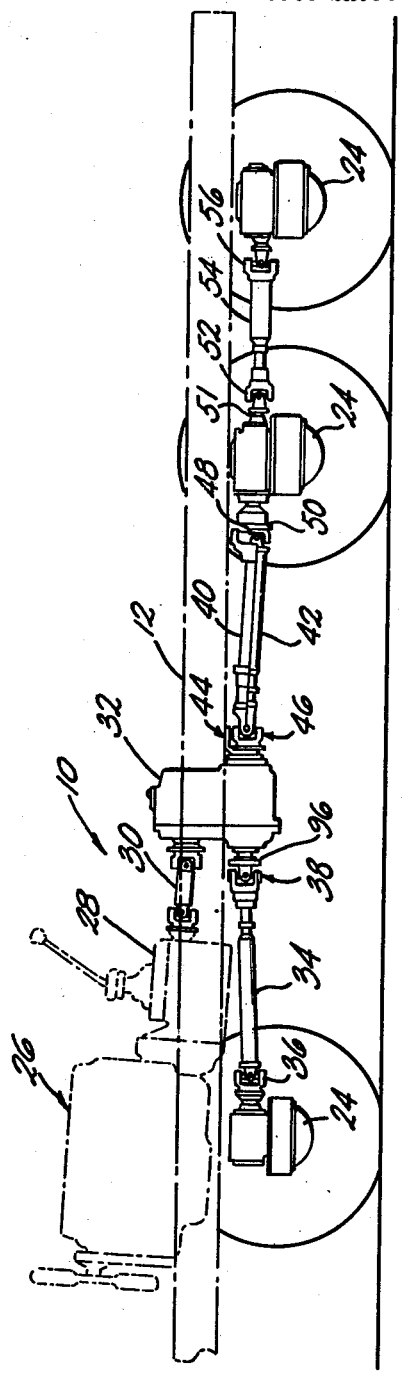
FIGURE 2 is a side elevational view showing the drive assembly of FIGURE 1.

Attention is now directed first to FIGURES 1 and 2 for a description of a motor vehicle in which the present invention is employed. Only portions of the vehicle are shown so that the drive system of the vehicle can more readily be seen. The vehicle 10 has a conventional frame 12 which is suitably supported on a front axle assembly 14 and a rear tandem axle assembly 16. The illustrated vehicle 10 has a six wheel drive; that is, both of the front wheels 18 are driving wheels, as are the tandem front wheels 20 and tandem rear wheels 22. In order to assure positive drive to both wheels 18, a differential transmission 24 of the type disclosed in U.S. Patent Nos. 3,198,035 or 3,230,795 may be used. Differential transmissions of the type shown in aforesaid pending application Nos. 568,549 or 615,484 may also be used. It is also to be understood that the invention in the present application is not restricted to the use of locking differentials of this type, since any other conventional type of locking differential may be employed. The tandem rear axle drive also will employ similar locking differentials 24.

The vehicle 10 is provided, in a conventional manner, with an internal combustion engine 26 and a transmission 28. An engine drive shaft 30 is connected at one end to the transmission 28 and at the other end to a differential transfer case assembly 32. In the illustrated embodiment of the invention, the differential transfer case assembly 32 is a two-speed assembly, as will be described, but it is to be understood that a single-speed differential transfer case assembly may be used without departing from the present invention.

Connected to the forward end of the differential transfer case assembly 32 is the front drive shaft 34 which is connected by means of universal joints 36 and 38 respectively to the front differential transmission 24 and to the differential transfer case assembly 32. Extending rearwardly from the differential transfer case assembly are outer drive shaft 40 and inner drive shaft 42, the latter extending axially through the center of the tubular drive shaft 40. The outer drive shaft 40 is connected to the differential transfer case 32 by means of a universal joint 44 while the inner drive shaft 42 is connected to the differential transfer case assembly 32 by means of the universal joint 46. The outer drive shaft 40 is connected at its rear to the differential transmission 24 of the front axle of the tandem assembly by means of the universal joint 48, and the inner drive shaft 42 is connected to the differential transmission 24 of the rear axle of the tandem assembly by a universal joint 50 which in turn is connected to a shaft 51 which has the universal joint 52 connected thereto, and the universal joint 52 has connected to it the rear drive shaft 54 which is connected by the universal joint 56 to the rear differential transmission 24.

From the foregoing description it is to be understood that all six of the drive wheels 18, 20 and 22 are drivingly connected to the motor 26, and the axle assemblies 14 and 16 are provided with locking-type differentials 24 so that if any of the drive wheels 18, 20 and 22 should lose traction, the remaining wheels will continue to receive substantially full driving torque for moving the vehicle.

As previously described, the present invention is directed toward an improved differential transfer case assembly 32 which not only provides a driving connection between the motor 26 and the wheels 18, 20 and 22, but which also is constructed and arranged so that it can accommodate any irregularities in the rate of revolution between the three axles so that there will be no problem of having one of the drive shafts 34, 40 or 42 excessively winding-up relative to the other drive shafts. In this respect it should be noted that drive shaft 54 and drive shaft 42 are in effect the same drive shaft.

Figure 3:
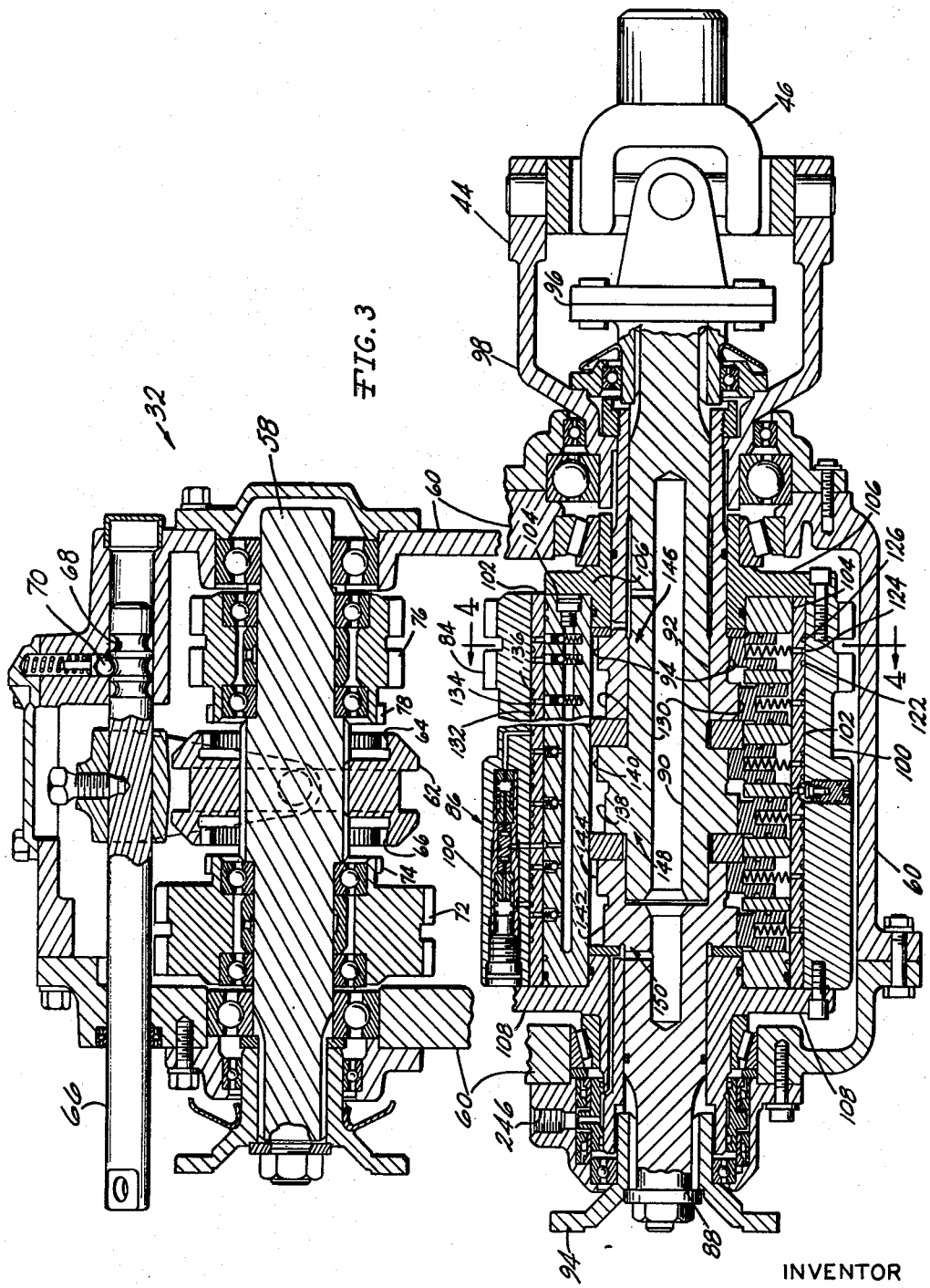
FIGURE 3 is a vertical longitudinal sectional view of a differential transfer case assembly embodying the present invention.

Referring now to FIGURE 3, a general description of the differential transfer case assembly will be given, after which the details of the invention will be set forth.

The differential transfer case 32 is a two-speed assembly, and the arrangement for providing the two speeds will be described at this time, it being understood that the structure for providing two speeds forms no part of the present invention. The input shaft 58 is adapted to be connected to the engine drive shaft 30 in any conventional manner and is journaled for rotation within the housing 60 of the differential transfer case 32. Splined to the shaft 58 for rotation therewith is the clutch ring 62 having internal gears 64 and 66. Positioned adjacent to the clutch ring 62 is the shift rod 66 which has a plurality of notches 68 for receiving the detent ball 70. The latter is spring actuated to hold the shift rod 66 in any of three desired positions. In the illustrated position, the clutch ring 62 is in a neutral position, and it is adapted to be shifted rearwardly, or to the right, into a low-speed position or forwardly into a high-speed position, as will be described. Journaled on the shaft 58 for rotation relative thereto is the high-speed gear 72 which contains an integral clutch gear 74 adapted to mesh with the internal gear 66 when the clutch ring 62 is moved forwardly or to the left. On the opposite end of the shaft 58 is journaled the low-speed gear 76 which has as an integral part thereof the clutch gear 78 adapted to mesh with the internal gear 64 of the clutch ring 62 when the latter is moved rearwardly or to the right.

Figure 4:
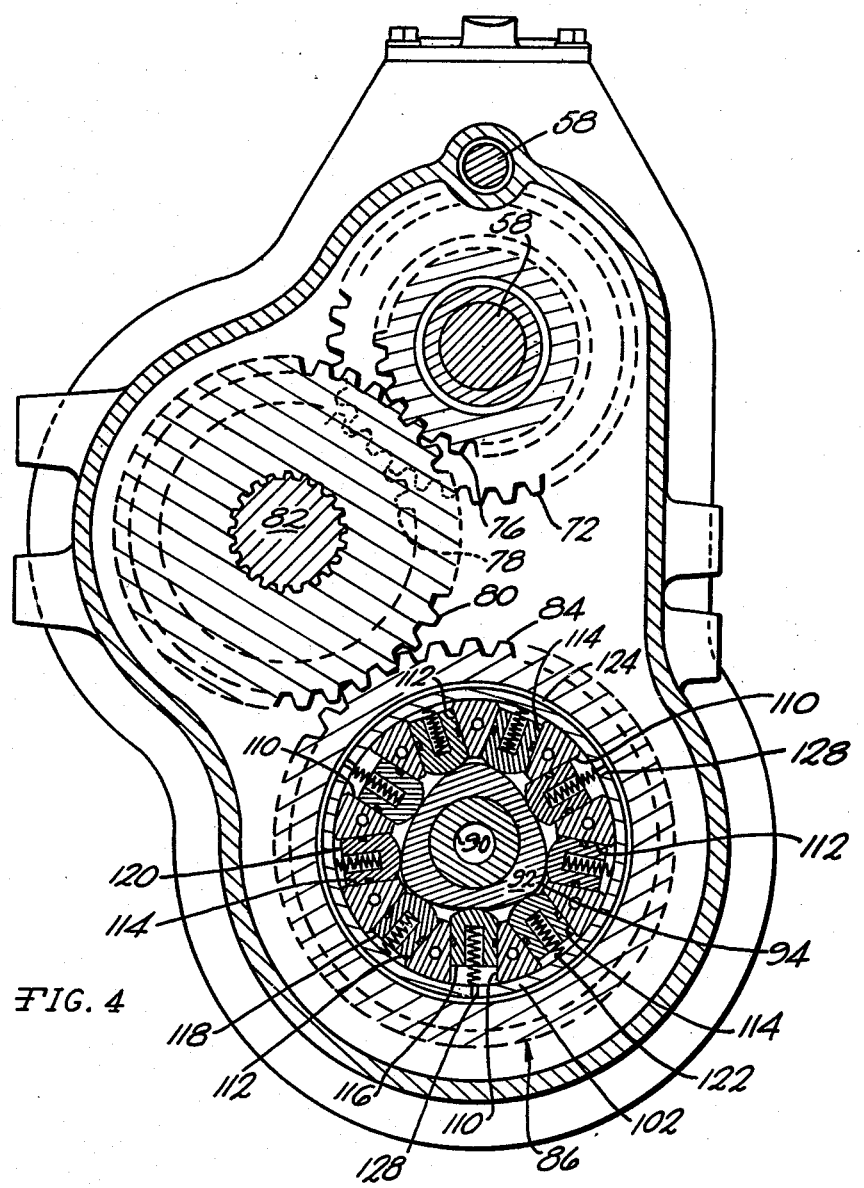
FIGURE 4 is a section taken on the line 4—4 of FIGURE 3.
Figure 5:
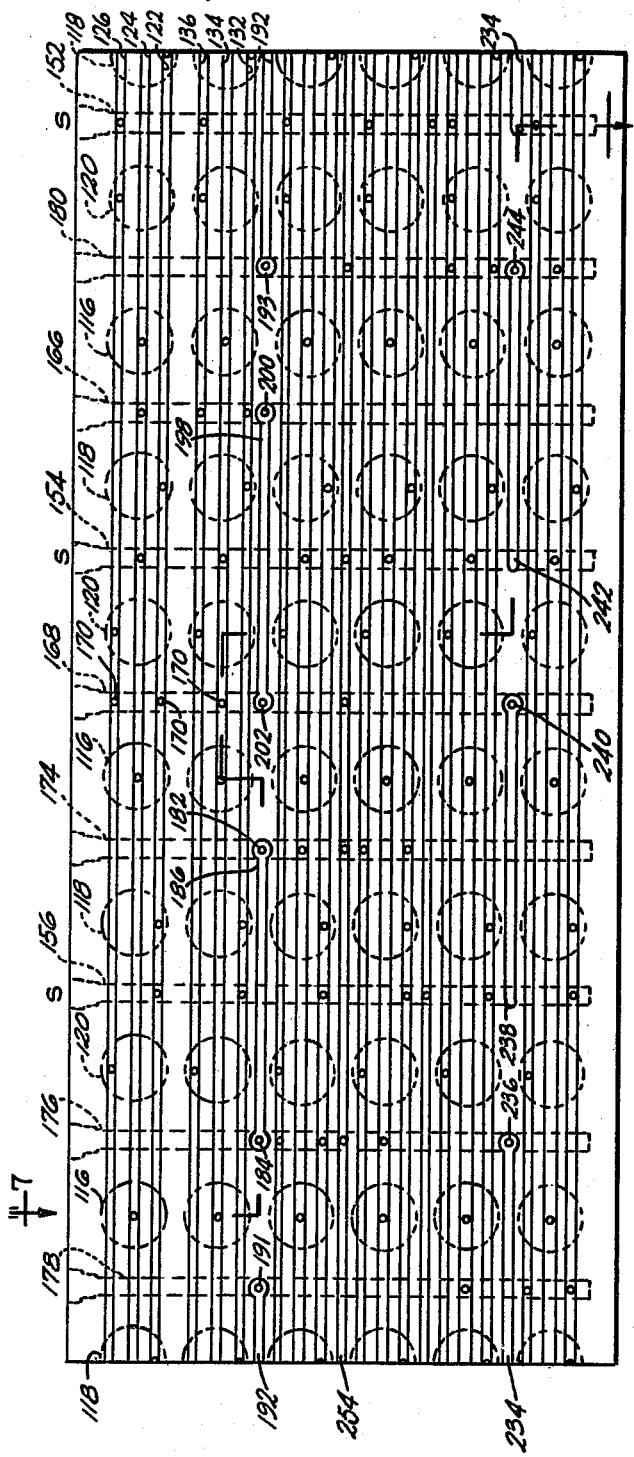
FIGURE 5 is a developed view of the fluid passages of the hydraulic torque transmitting mechanisms in the differential transfer case assembly illustrated in FIGURE 3.

As seen best in FIGURE 4, the gears 72 and 76 are in mesh respectively with the pinion gears 78 and 80 which are splined on the pinion shaft 82. Therefore, the rate at which the pinion shaft 82 rotates will be governed by whichever of the gears 72 or 76 is in mesh with the clutch ring 62. The pinion gear 80 is in mesh with ring gear 84 which is a part of the rotatable casing 86, and thus, ring gear 84 and casing 86 are adapted to be driven by the pinion gear 80. In this manner, a two-speed gear drive is provided between the engine and the rotatable casing 86. As previously described, the two-speed features of the differential transfer case assembly are conventional in the art and form no part of the present invention.

Referring first to FIGURE 3 of the drawings, the mechanisms for driving the drive shafts from the rotatable casing 86 will now be described. Coaxially aligned within the casing 86 are three output drive shaft members 88, 90 and 92 which are adapted for driving respectively the drive shafts 34, 40 and 42. Splined to the forward end of the shaft 88 is the member 94 which is a part of one yoke 96 of the universal joint 38 to which the drive shaft 34 is connected. The shaft member 90 is similarly connected to yoke 96 of the universal joint 46 which in turn is connected to the drive shaft 42. In a similar manner, the yoke 98 of the universal joint 44 is splined to the shaft member 92 to provide a driving connection to the drive shaft 40. It will be observed that the shaft member 92 is tubular in construction and is telescoped over the shaft member 90.

Torque transmitting mechanisms are operatively connected between the casing 86 and each of the shaft members 88, 90 and 92 so that each of said shaft members will rotate with said casing 86. These torque transmitting mechanisms are operatively coupled between the casing 86 and each of the output shaft members 88, 90 and 92 for transmitting all of the input torque delivered to the casing 86, in substantially equal portions to the output shaft members for turning such shaft members constantly at substantially equal rates of revolution relative to one another.

With particular reference to FIGURES 3 and 4, one of the torque transmitting mechanisms disposed between casing 86 and shaft member 92 will now be described. As there shown, the shaft member 92 has around its outer periphery a plurality of radially directed rise and fall cam surfaces 94. In the illustrated embodiment, three equiangular rise and fall portions are utilized. The three portions are arranged so that they will provide both dynamic and static balance, and the surfaces are shaped to provide proper flow of hydraulic fluids for a purpose to be described. The specific shapes of the surfaces are arrived at by a procedure particularly set forth in the aforesaid pending applications, Serial Nos. 568,549 and 615,484.

The casing 86 includes an outer section 100, an intermediate section 102, an inner section 104 and end members 106 and 108 which are suitably secured together for co-rotation and so as to provide a hermetically sealed unit for retaining hydraulic fluid. In the section 104 of casing 86 are located a plurality of radially inwardly directed, circumferentially aligned pressure chambers 110, 112 and 114 which are closed on their outer ends by the inner circumference of section 102 of casing 86. The chambers 110 comprise a first set of chambers, the chambers 112 comprise a second set of the chambers, and the chambers 114 comprise a third set of chambers. Located within the pressure chambers 110, 112 and 114 are pistons 116, 118 and 120 which are adapted to reciprocate therein, and these pistons are also in first, second and third sets. The cam surfaces 94 are located radially inwardly of the pistons 116, 118 and 120, and the pistons have hollow interiors in which are located coil springs 122 for biasing the pistons against the cam surfaces 94 so that the pistons will reciprocate upon rotation of the shaft member 92 relative to the casing 86.

Formed in the casing 86 between outer section 100 and 102 are annular grooves or passageways 122, 124 and 126. The groove 124 is in communication with each of the pressure chambers 110 by means of the radial ducts 128. In a similar manner, not shown, the pressure chambers 112 are in communication with the annular groove 122, and the pressure chambers 114 are in communication with the annular groove 126. Thus, the chambers of each set are in communication with a common one of the grooves 122, 124 and 126.

In the illustrated embodiment of the invention a dual torque transmitting mechanism is provided between the casing 86 and each of the shaft members 88, 90 and 92. The second torque transmitting mechanism for shaft member 92 is identically the same as the one described, but it is axially displaced therefrom and is 180 degrees out of phase with the piston-and-chamber arrangement described. Thus it can be seen that the cam surface 130 is 180 degrees out of phase with the cam surface 94, but in other respects the arrangement of pistons and pressure chambers is identically the same. Likewise, the second torque mechanism associated with shaft member 92 has three annular grooves 132, 134 and 136 associated therewith. In normal operation, the pressure chambers associated with the cam surfaces 94 and 140 will be filled with hydraulic fluid, and it will be understood that turning of shaft 92 relative to casing 86 will be restricted to the extent that the hydraulic fluid can be displaced from these chambers by virtue of the pumping action of the pistons in these chambers. The construction and arrangement whereby hydraulic fluid can be displaced from the pressure chambers will now be described, and this will be done with reference to the similar hydraulic circuits that exist for the torque transmitting mechanisms associated with each of shaft members 90 and 88.

As can be seen best in FIGURE 3, shaft member 90 has a pair of rise and fall cam surfaces 138 and 140 which cooperate and function with sets of pistons and piston chambers in substantially the same manner as do the cam surfaces 130 and 94 previously described. Also, the shaft member 88 has cam surfaces 142 and 144 which also cooperate and function in conjunction with piston and pressure chambers in a like manner. The specific details and particular arrangements of piston and cylinders associated with shaft members 88 and 90 will not be described because they are the same as previously described in conjunction with the shaft member 92. For purposes of description, the dual torque transmitting mechanisms associated with shaft member 92 will be referred to by numeral 146, the dual torque transmitting mechanisms associated with shaft member 90 will be referred to by numeral 148, and the dual torque transmitting mechanisms associated with shaft member 88 will be referred to by numeral 150.

The hydraulic circuits associated with each of torque transmitting mechanisms 146, 148 and 150 are in communication in a manner to be described so that if the reaction forces on one of the shaft members tending to rotate it relative to casing 86 is greater than the reaction forces on the other shaft members, a pressure differential between the hydraulic circuits of the torque transmitting mechanisms will develop, and the communication between the hydraulic circuits of the respective torque transmitting mechanisms is such as to allow equalization of these pressures, and in so doing, to allow relative turning of one or more of the output shaft members 88, 90 and 92 relative to casing 88 until pressure equilibrium is established. This will have the effect of compensating for irregular turning of the various wheels associated with each of the drive shafts so that winding of one of the drive shafts relative to the others will be effectively minimized so that no undesirable results occur. Referring now more particularly to FIGURES 4–9, the complete hydraulic circuits for enabling limited reciprocating movement of the pistons, and the arrangement whereby the hydraulic circuits associated with each torque transmitting mechanism are coupled together will be described.

Extending axially inwardly from one end of the inner section 104 of casing 86 are three supply passageways 152, 154 and 156. Supply passageway 152 is in communication with groove 126, and therefore, with each of the pressure chambers 114 via the radial duct 158. It will be observed that a ball-check valve 160 is provided in the passageway to allow flow only in one direction from the supply passageway 152 to the groove 126. Also positioned in the passageway or radial duct 158 is a flow control element 162 for controlling the rate of flow of fluid from the passageway 152 to the groove 126. From FIGURE 9 it will be apparent that supply passageway 152 is in similar communication with sets of other corresponding pressure chambers of each of the torque transmitting mechanisms 146, 148 and 150.

Figure 9:
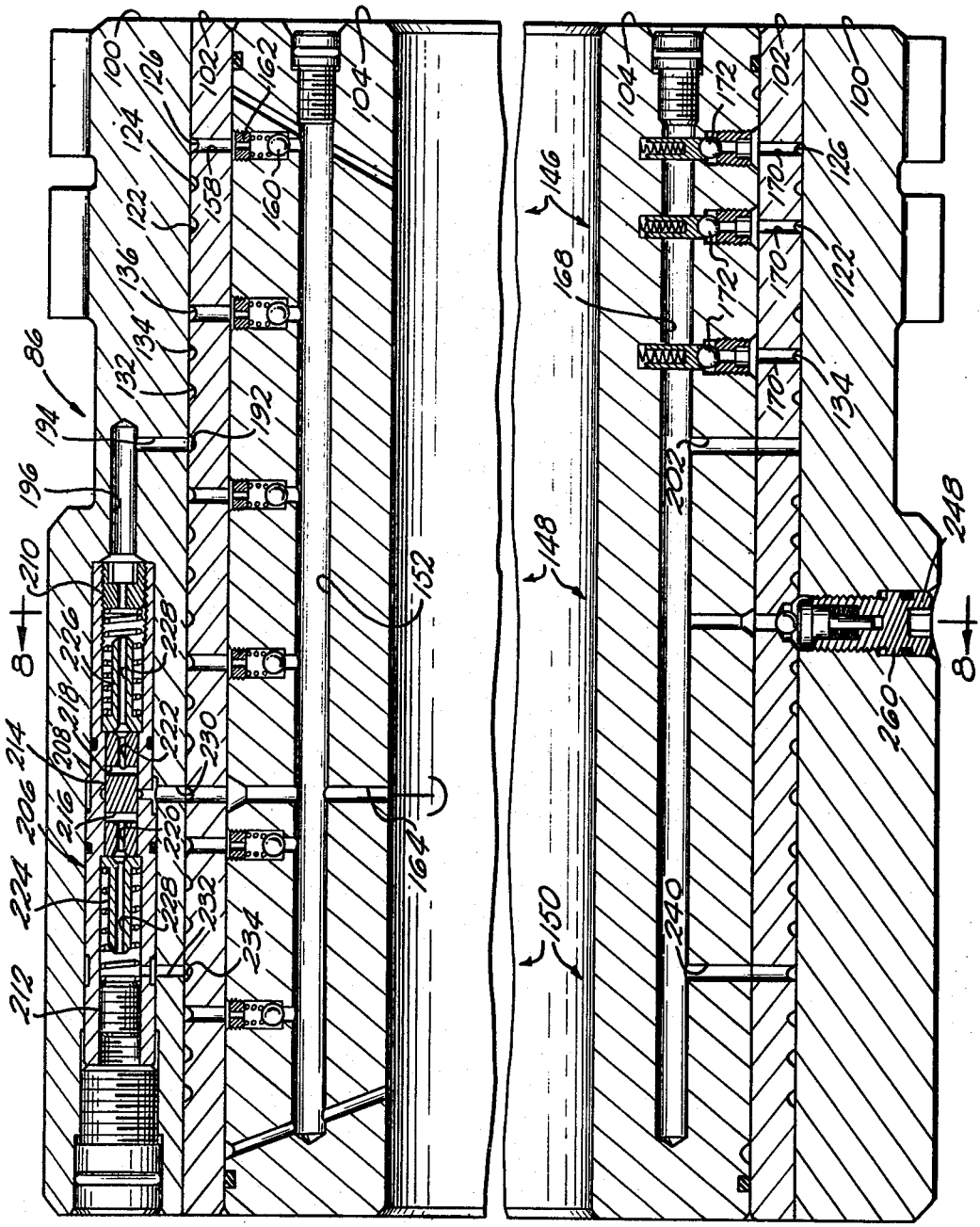
FIGURE 9 is an enlarged fragmentary sectional view of a portion of the differential transfer case assembly taken on the line 9—9 of FIGURE 7.

In a similar manner, supply passageway 154 is in communication with annular groove 124, and each of the corresponding grooves for each of the other sets of torque transmitting mechanisms for providing fluid communication between supply passageway 154 and pressure chambers 110 and each corresponding set of pressure chambers. In a similar manner, supply passageway 156 is in communication with annular groove 122 and each corresponding groove of each of the other torque transmitting mechanisms so as to be in communication with the pressure chambers 112 and each of the corresponding sets of pressure chambers associated with each of the other torque transmitting mechanisms. Each of the supply passageways 152, 154 and 156 is also in communication with the interior of the casing 86 by means of radial ducts, such as is shown in FIG. 9 at 164. Thus, it can be seen that one-way flow of fluid from the interior of the casing 86 through the supply passageways 152, 154 and 156 to each of the pressure chambers is provided.

Each of the torque transmitting mechanisms 146, 148 and 150 has two pressure passageways to which the pressure chambers can discharge when relative rotation occurs between its associated output shaft member and the casing 86. The two pressure passageways associated with the torque transmitting mechanism 146 are passageways 166 and 168, the latter of which can be seen in detail in FIGURE 9. As there shown, grooves 122 and 126 associated with the pistons traveling on cam surface 94 and the groove 134 associated with the pistons traveling on the cam surface 130 are in communication with passageway 168 through radial passageways 170. It will be observed that each of passageways 170 has a ball-check valve which is positioned to allow flow of fluid from the grooves to passageway 168 but which will prevent return flow. The remaining three grooves associated with the torque transmitting mechanism 146 are similarly in communication with pressure passageway 166. Details of this passageway are not shown since the arrangement is essentially the same as that shown in FIGURE 9 in respect to passageway 168, except that grooves 124, 132 and 136 are in communication with passageway 166. In a similar manner two pressure passageways 174 and 176 are in communication with the pressure chambers forming a part of torque transmitting mechanism 148, and pressure passageways 178 and 180 are in communication with the pressure chambers forming a part of torque transmitting mechanism 150.

Figure 7:
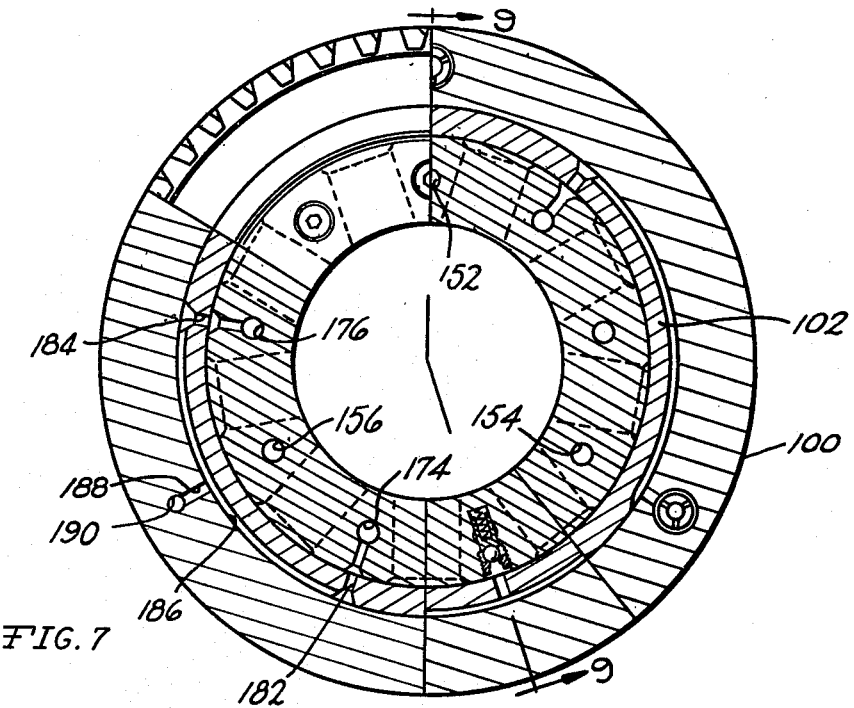
FIGURE 7 is a fragmentary sectional view of a portion of the differential transfer case assembly taken along the line 7—7 of FIGURE 5.

Each of the pairs of associated pressure passageways are in communication with one another. Referring to FIGURE 7, the arrangement providing communication between passageways 174 and 176 can be seen. As there shown, passageway 174 is in communication with a radial passageway 182 and passageway 176 is in communication with another radial passageway 184. Radial passageways 182 and 184 are in communication with each other by means of a groove 186 located between intermediate section 102 and outer section 100 of the casing 86. A radial duct 188 extends radially outwardly from the groove 186 and terminates in an axial passageway 190.

A groove 192, see FIGURE 9, provides communication between the pressure passageways 178 and 180 via radial ducts 191 and 193, respectively, and is in communication with the radial duct or passageway 194 which communicates in turn with the axial passageway 196, also located in the section 100 of the casing 86. In a similar manner, a groove 198 is formed between the sections 100 and 102 and provides communication between the pressure passage ways 166 and 168 via the radial ducts 200 and 202, which in turn communicate with the axial passage 204 in the outer section 100. In each axial passageway 190, 196 and 204 (see FIGURE 8) is located a device for equalizing the pressure in the hydraulic systems of each of the torque transmitting mechanism 146, 148 and 150. As previously explained, the torque transmitting mechanism 146 is associated with the pressure passageways 166 and 168, the torque transmitting mechanism 148 is associated with the pressure passageways 174 and 176, and the torque transmitting mechanism 150 is associated with the pressure passageways 178 and 180.

Positioned in each axial passageways 190, 196 and 204, is a pressure equalizing device 206. Each device 206, see FIGURE 9, includes a sleeve 208 at one end of which is threadedly connected a flow control element 210. At the other end of the sleeve 208 is a plug 212 and centrally located within sleeve 208 is a slide member 214 which has transverse passageways 216 and 218. Axial passageways 220 and 222 provide communication respectively between opposite ends of the sleeve 208 and the transverse ducts 216 and 218. Positioned on opposite sides of the slide element 214 are push rods 224 and 226 which are spring biased to urge the side member 214 to the position shown in FIGURE 9. Note that the push rods 224 and 226 are adapted for normally seating on the internal shoulders of the sleeve 208 and each has an axial passageway 228 in communication with the axial passageways in the slide member 214. Thus, if a fluid pressure on either side of the slide member 214 exceeds that of the fluid on the opposite side of slide member 214, such pressure will act to urge the slide member 214 in the opposite direction until the slide member 214 has assumed a position wherein the transverse passageways 216 or 218 on the higher pressure side is in communication with the radial passageway 230, which passageway 230 discharges to the supply passageway 152. Movement of the slide member 214 to this position will have the effect of relieving the pressure on the high pressure side, and as previously explained, this will relieve the pressure at the pressure cylinders of the associated torque transmitting mechanism which in turn is associated with one of the axial ducts 190, 196 or 204.

In each instance, the pressure compensating device 206 is in communication at one end with one of the axial passageways 190, 196 and 204 as has been described, and at the opposite end with a radial duct 232 which is in communication with another one of such axial passageways. Thus, in FIGURE 9, the radial duct 232 is in communication with the groove 234, which in turn communicates with pressure passageway 176 via a radial duct 236, see FIGS. 5 and 6. In a like manner, a groove 238 provides communication between the corresponding end of a pressure equalizing device 206 and pressure passageway 168 via radial duct 240. In the same manner, groove 242 provides communication between a third one of the pressure equalizing device 206 and pressure passageway 180 via radial duct 244.

Figure 6:
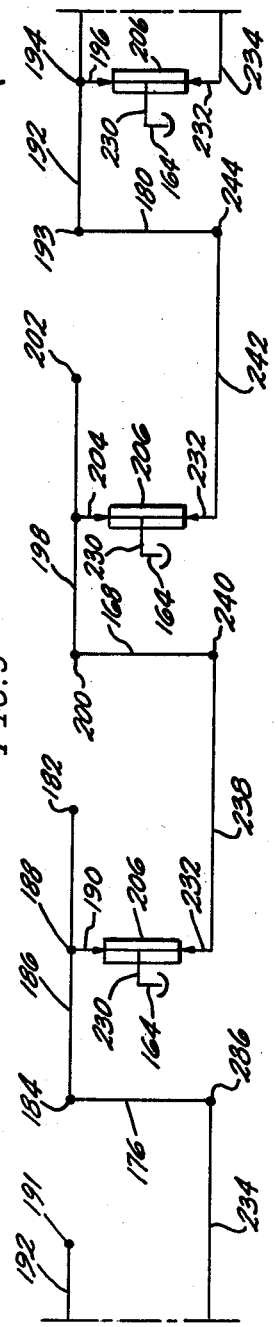
FIGURE 6 is a schematic view showing the hydraulic circuits for coupling the torque transmitting mechanisms associated with each of the plurality of drive shafts.

Thus it can be understood that a pressure equalizing device 206 is located between the hydraulic circuits of each of the torque transmitting mechanisms 146, 148 and 150. This arrangement is schematically shown in FIGURE 6, to which reference is now made. As shown, each pressure compensating device 206 is adapted to discharge to the interior of the casing 86 via the passageways 230 and 164. One such pressure equalizing device 206 is operatively positioned between pressure passageways 176 and 168, associated with torque transmitting mechanisms 148 and 150; a second pressure equalizing device 206 is operatively positioned between pressure lines 168 and 180, which are associated with torque transmitting mechanisms 150 and 146; and the third pressure equalizing device 206 is operatively positioned between the pressure lines 180 and 176, which are associated with torque transmitting mechanisms 146 and 148. Under these circumstances, substantially no turning of any of the drive shaft members 88, 90 or 92 can occur relative to the casing 86 so long as the pressure remains the same in the hydraulic circuits of the three torque transmitting mechanism. This is so because the circuits are essentially closed circuits and the pistons cannot reciprocate because the fluids are locked in the pressure chambers, and under equal pressure conditions there is no place to discharge the hydraulic fluid contained in such piston chambers. However, if greater resistance or reaction to turning of one of the output shaft members 88, 90 or 92 occurs due, for example, to larger tires of its associated wheels, or the like, winding of the associated drive shaft will not occur to any appreciable extent because the pressure of the hydraulic fluid in the torque transmitting mechanism associated with that particular drive shaft member will increase until the pressure equalizing device 206 is actuated to release the pressure momentarily within the the circuit allowing limited differential action to occur between such drive shaft member and the casing 86. Thus, the pressure equalizing devices 206 and their associated circuits are responsive to reaction forces on the output shaft members 88, 90 and 92 and function to release in limited amounts the holding action of the torque transmitting mechanism which is subjected to the greatest reaction load or force.

The casing 86 is hermetically sealed and is completely filled with the hydraulic fluid. If fluid is discharged from any pressure chamber due to reciprocation of the pistons in the manner previously described, the voids in the hydraulic system will be replenished substantially immediately by the pumping action of the pistons which will suck or draw fluid from the appropriate one of the supply passageways 152, 154 or 156 past the ball-check valves 160. The casing 86 may contain a volumetric compensator for compensating for differences in volume of the hydraulic fluid due to temperature variations. Reference is made to pending application Ser. No. 615,484 for teachings of this feature. As there indicated, the volumetric compensator may be located either internally or externally of the casing 86. In the present instance the compensator is located externally of the casing 86, and is in communication with the interior of casing 86 by means of inlet port 246, FIGURE 3, which leads to a closed fluid reservoir, not shown.

Figure 8:
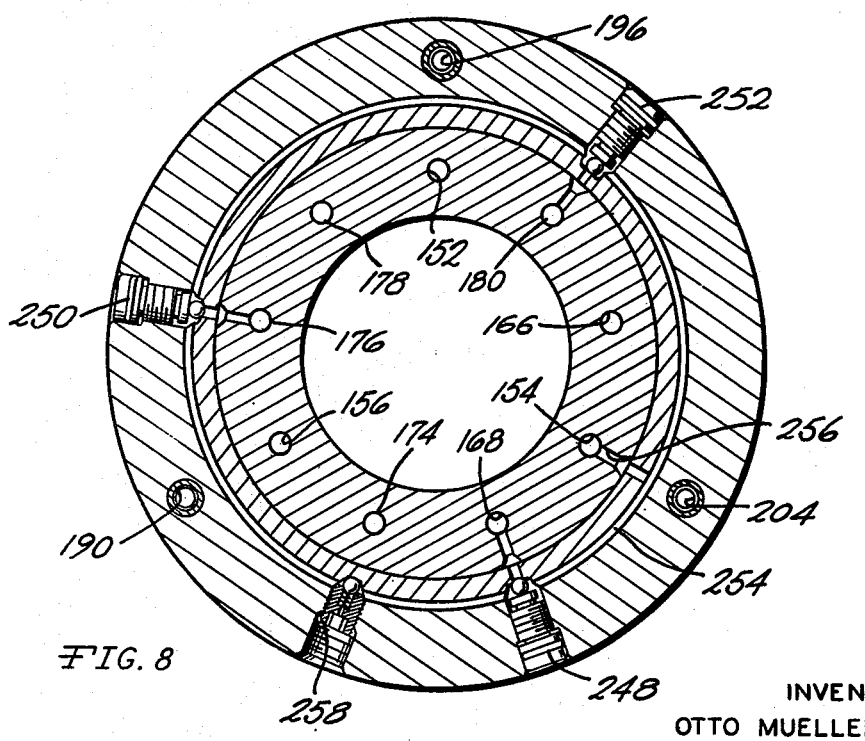
FIGURE 8 is a sectional view of a portion of the differential transfer case assembly taken on the line 8—8 of FIGURE 9.

The closed casing 86 is provided with overload check valves 248, 250 and 252, FIGURE 8, details of which can be seen in FIGURE 9. These valves are spring actuated to open in the event an overload occurs in any of pressure passageways 168, 176 and 180. If this condition should arise, any of the valves can open providing communication via annular groove 254 and radial duct 256 with supply passageway 154.

For the purposes of initially filling the casing, vacuum fitting 258 is provided. When filling, the overload check valves 248, 250 and 252 are opened by partially unscrewing the fitting 260, FIGURE 9, and a vacuum pump is connected to vacuum fitting 258. The fluid is introduced through port 246 while air is being removed by the vacuum pump. After the casing is filled the source of supply of fluid is interrupted, but the port 246 will remain in communication with a sealed source of fluid containing a volumetric compensator. The overload check valves are then closed to proper pressure settings and the assembly is ready for operation.

Having thus described my invention, I claim:

1. A differential transfer case assembly comprising a rotatable casing for transmitting an input torque, a plurality of output shaft members extending into said casing, torque transmitting mechanisms operatively coupled between said casing and each of said output shaft members for transmitting all of said input torque in substantially equal portions from said casing to said output shaft members for turning said shafts constantly at substantially equal rates of revoltuion relative to one another, each mechanism including locking means responsive to reaction load on its associated shaft normally locking its associated shaft to the casing for corotation, said torque transmitting mechanisms including interconnecting means responsive to reaction load differentials on said shafts for releasing momentarily the locking means associated with such shafts to permit rotation of said shaft members relative to one another an amount sufficient to equalize the reaction loads on said shaft members.

2. A differential transfer case assembly for a motor vehicle having a multi-axle drive comprising a rotatable casing for transmitting an input torque, a plurality of output shaft members extending into said casing, each adapted to be connected to a separate one of the axles, said output shaft members being coaxially aligned, one of said shaft members being a sleeve surrounding another of said shaft members, torque transmitting mechanisms operatively coupled between said casing and each of said output shaft members for transmitting all of said input torque in substantially equal portions from said casing to said output shaft members for turning said shafts constantly at substantially equal rates of revolution relative to one another, each mechanism including locking means responsive to reaction load on its associated shaft normally locking its associated shaft to the casing for corotation, said torque transmitting mechanisms including interconnecting means responsive to reaction load differentials on said shafts for releasing momentarily the locking means associated with such shafts to permit rotation of said shaft members relative to one another an amount sufficient to equalize the reaction loads on said shaft members.

3. A differential transfer case assembly for a motor vehicle having a multi-axle drive comprising a rotatable casing for transmitting an input torque, a plurality of output shaft members extending into said casing, each adapted to be connected to a separate one of the axles, said output shaft members being three in number in coaxial alignment, one of said shaft members being a sleeve surrounding one of the other shaft members, torque transmitting mechanisms operatively coupled between said casing and each of said output shaft members for transmitting all of said input torque in substantially equal portions from said casing to said output shaft members for turning said shafts constantly in substantially equal rates of revolution relative to one another, said torque transmitting mechanisms being operatively coupled together to rotate said shaft members relative to one another an amount sufficient to equalize irregularities in rates of revolution occurring between said shaft members.

4. A differential transfer case assembly according to claim 3, wherein the three torque transmitting mechanisms associated respectively with said three shaft members are spaced axially within said casing, the sleeve shaft member and the surrounded shaft member extending in one direction from the casing and the other shaft member extending in the other direction from the casing, said sleeve shaft member being operatively coupled to one end torque transmitting mechanism, and each of the other two shaft members being operatively coupled to the other torque transmitting mechanisms.

5. A differential transfer case assembly according to claim 1, wherein each of said torque transmitting mechanisms includes hydraulic means for locking associated shaft member and said casing together for corotation.

6. A differential transfer case assembly according to claim 5, wherein said torque transmitting mechanisms are coupled together by hydraulic circuits in communication with one another, each of said hydraulic means being responsive to its associated shaft member attempting to turn relative to said casing to increase the pressure of the hydraulic fluid in its circuit so as to oppose such relative turning, and pressure regulating means between said circuits responsive to pressure differentials between such circuits to release pressure in the circuit of higher pressure so that incremental turning of the associated shaft member relative to the casing can occur until a state of equilibrium between the pressures in the hydraulic circuits is reached.

7. A differential transfer case assembly according to claim 6, wherein said pressure regulating means includes flow control elements for controlling the rate at which said state of equilibrium is reached.

8. A differential transfer case assembly according to claim 6, wherein said casing and hydraulic circuits are filled with hydraulic fluid to the exclusion of air, and said pressure regulating means is operable to discharge fluid from said circuits to the interior of said casing when pressure is released in one of said circuits.

9. A differential transfer case assembly according to claim 8, wherein supply means communicate between said torque transmitting mechanisms and the interior of the casing, and said torque transmitting mechanisms are operable to pump fluid into said circuits to replenish the same.

10. A differential transfer case assembly for a motor vehicle having a multi-axle drive comprising a rotatable casing for transmitting an input torque, a plurality of output shaft members extending into said casing, each adapted to be connected to a separate one of the axles, torque transmitting mechanisms operatively coupled between said casing and each of said output shaft members for transmitting all of said input torque in substantially equal portions from said casing to said output shaft members for turning said shafts constantly at substantially equal rates of revolution relative to one another, said torque transmitting mechanisms being operatively coupled together to rotate said shaft members relative to one another an amount sufficient to equalize irregularities in rates of revolution occurring between said shaft members, each of said torque transmitting mechanisms including hydraulic means for retaining its associated shaft member and said casing together for corotation, said torque transmitting mechanisms being coupled together by hydraulic circuits in communication with one another, each of said hydraulic means being responsive to its associates shaft member attempting to turn relative to said casing to increase the pressure of the hydraulic fluid in its circuit so as to oppose such relative turning, and pressure regulating means between said circuits responsive to pressure differentials between such circuits to release pressure in the circuit of higher pressure so that incremental turning of the associated shaft member relative to the casing can occur until a state of equilibrium between the pressure in the hydraulic circuits is reached, said casing and hydraulic circuits being filled with hydraulic fluid to the exclusion of air, and said pressure regulating means is operable to discharge fluid from said circuits to the interior of said casing when pressure is released in one of said circuits, and relief pressure means associated with the circuits of each of said torque transmitting mechanisms for discharging to the exterior of said casing.

11. A differential transfer case assembly comprising a rotatable casing for transmitting an input torque, a plurality of output shaft members extending into said casing, torque transmitting mechanisms operatively coupled between said casing and each of said output shaft members for normally transmitting all of said input torque in substantially equal portions to said output shaft members, each of said torque transmitting mechanisms including locking means normally locking its associated shaft to the casing for corotation and being releasable from said casing to reduce the torque delivered to its associated shaft member, means coupling said torque transmitting mechanisms together and responsive to reaction loads on said output shaft members to actuate the torque transmitting mechanism of any shaft member having a relatively greater reaction load than that of the other shaft members so as to release the locking means of such mechanism from the casing until the reaction loads are equalized.

12. A differential transfer case assembly according to claim 11, wherein said coupling means is operatively coupled to said torque transmitting mechanisms for actuating the released mechanism when the reaction loads are equalized so that such mechanism is again recoupled to said casing.

References Cited

UNITED STATES PATENTS

| | | | |
|---|---|---|---|
| 1,429,100 | 9/1922 | Ross | 74—650 |
| 1,887,229 | 11/1932 | Button et al. | 74—650 X |
| 2,395,355 | 2/1946 | Thompson | 192—60 |
| 2,399,201 | 4/1946 | Buckendale et al. | 74—665 |
| 2,562,177 | 7/1951 | Hitte | 74—650 |
| 2,742,684 | 4/1956 | Rising et al. | 180—22 X |
| 2,861,478 | 11/1958 | Donner | 74—711 |
| 2,997,897 | 8/1961 | Brownyer | 74—711 |
| 3,198,035 | 8/1965 | Mueller | 74—650 |
| 3,323,389 | 6/1967 | House | 74—710.5 |
| 3,400,777 | 9/1968 | Hill | 74—665 X |

DONLEY J. STOCKING, Primary Examiner

THOMAS C. PERRY, Assistant Examiner

U.S. Cl. X.R.

74—665; 180—23; 192—60